United States Patent
Kanayama

(10) Patent No.: US 7,539,299 B2
(45) Date of Patent: May 26, 2009

(54) OFFICE-LINE TRUNK CIRCUIT OPERATING ON GROUND-START AND LOOP-START MODES, METHOD OF CONTROLLING SAME, AND CONTROL PROGRAM FOR SAME

(75) Inventor: Kazuo Kanayama, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 1027 days.

(21) Appl. No.: 10/926,363

(22) Filed: Aug. 26, 2004

(65) Prior Publication Data

US 2005/0047588 A1 Mar. 3, 2005

(30) Foreign Application Priority Data

Aug. 27, 2003 (JP) .............................. 2003-302637

(51) Int. Cl.
*H04M 1/00* (2006.01)
*H04M 9/00* (2006.01)
*H04M 9/08* (2006.01)

(52) U.S. Cl. ............................ 379/399.01; 379/399.02; 379/413; 379/333

(58) Field of Classification Search ............ 379/399.01, 379/399.02, 413, 333
See application file for complete search history.

(56) References Cited

U.S. PATENT DOCUMENTS

| 4,796,290 A | * | 1/1989 | Perry | 379/27.01 |
| 4,856,058 A | * | 8/1989 | Sato et al. | 379/394 |
| 4,864,605 A | * | 9/1989 | Ramsay et al. | 379/379 |

FOREIGN PATENT DOCUMENTS

| JP | 56-122552 | A |   | 9/1981 |
| JP | 59-168795 | A |   | 9/1984 |
| JP | 60182898  |   |   | 9/1985 |
| JP | 362220096 | A | * | 9/1987 |
| JP | 01208094  |   |   | 8/1989 |
| JP | 03-188793 | A |   | 8/1991 |
| JP | 05211527  |   |   | 8/1993 |
| JP | 62-220095 | A |   | 9/1997 |

\* cited by examiner

*Primary Examiner*—Quynh H Nguyen
(74) *Attorney, Agent, or Firm*—Sughrue Mion, PLLC

(57) ABSTRACT

An office-line trunk circuit is provided to selectively operate on ground-start and loop-start modes. In this circuit, a DC current detection circuit has (i) a first photo coupler detecting a DC loop current caused responsively to supply of the ground to a tip line and a negative power to a ring line from an office bilateral trunk and (ii) a resistor whose resistance is adjusted to prevent a loop start in the office bilateral trunk and allow DC current to be detected. The first photo coupler detects the loop current using the resistor. An incoming detection circuit has a second photo coupler detecting a ring signal coming from the office bilateral trunk. A DC sink circuit has a diode bridge placed between the tip and ring lines and configured to have a DC circuit provided with a transistor controlling the DC loop current so that the office bilateral trunk is allowed to selectively be loop-activated and loop-held.

13 Claims, 6 Drawing Sheets

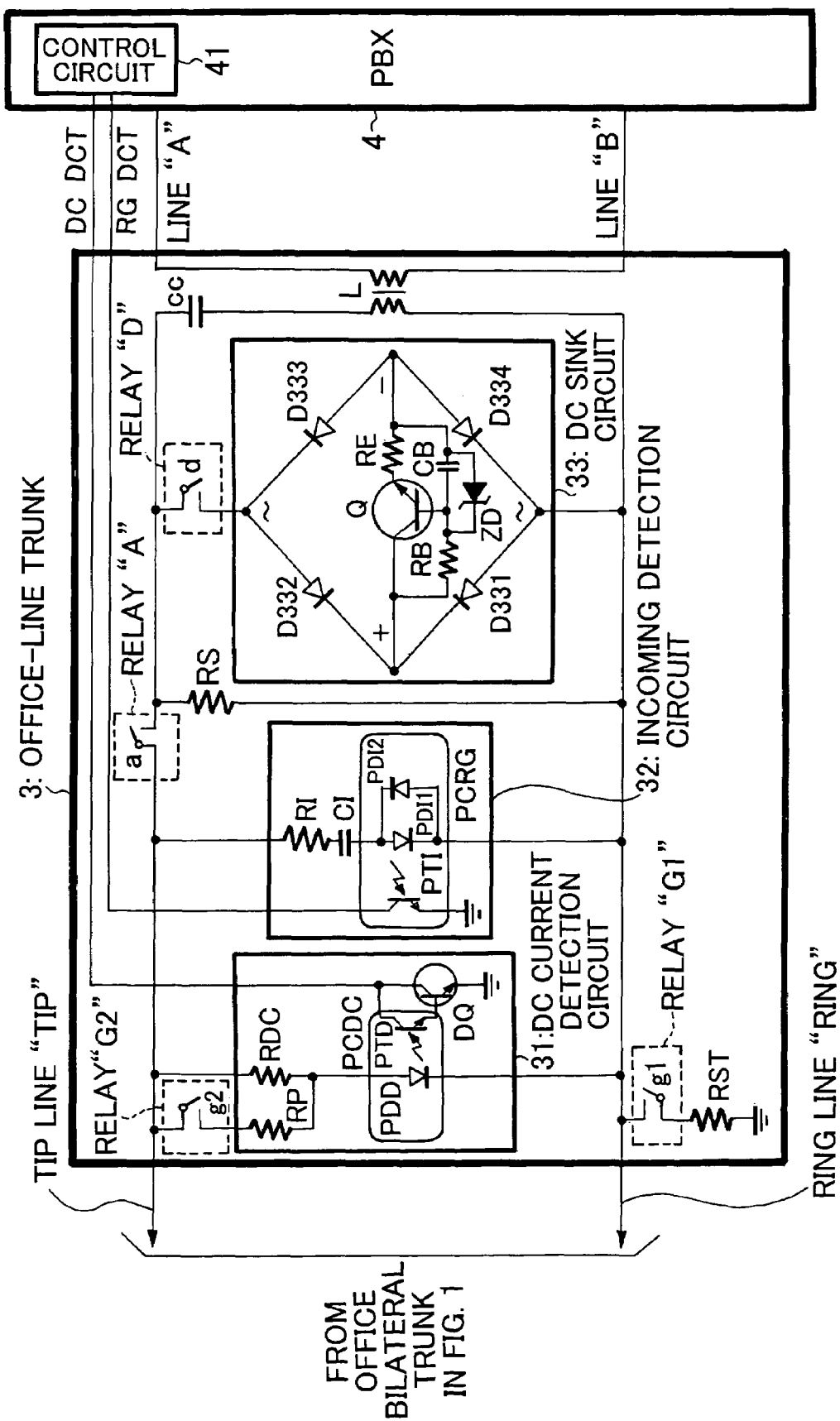

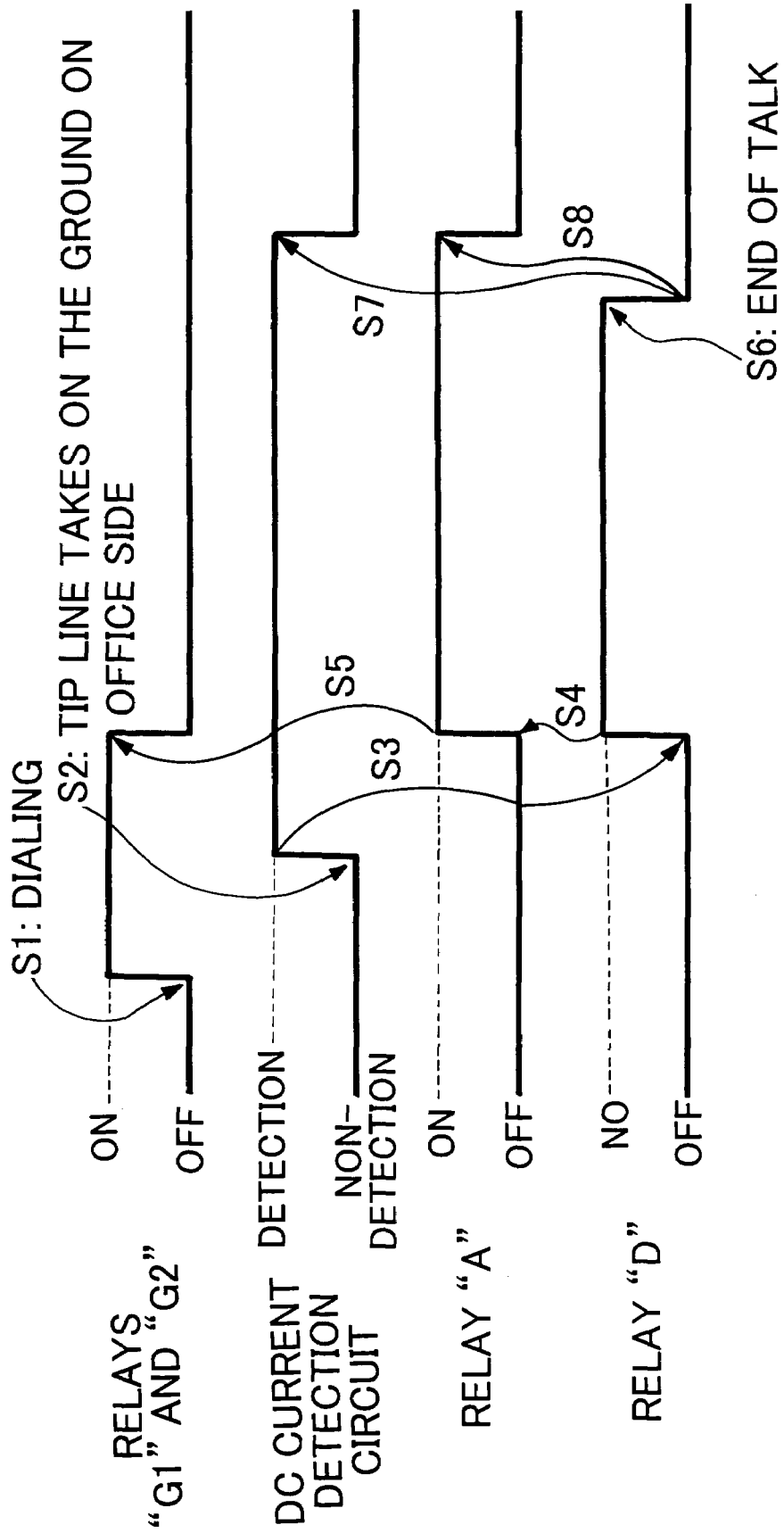

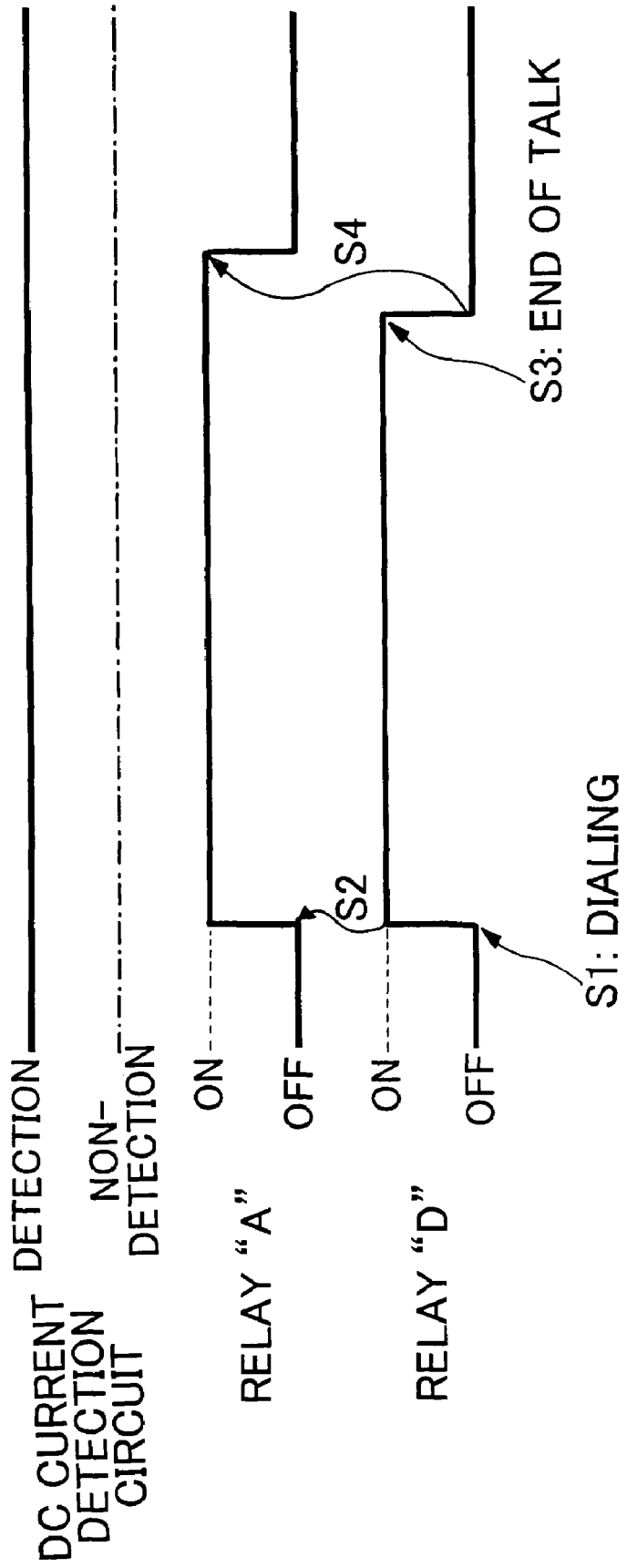

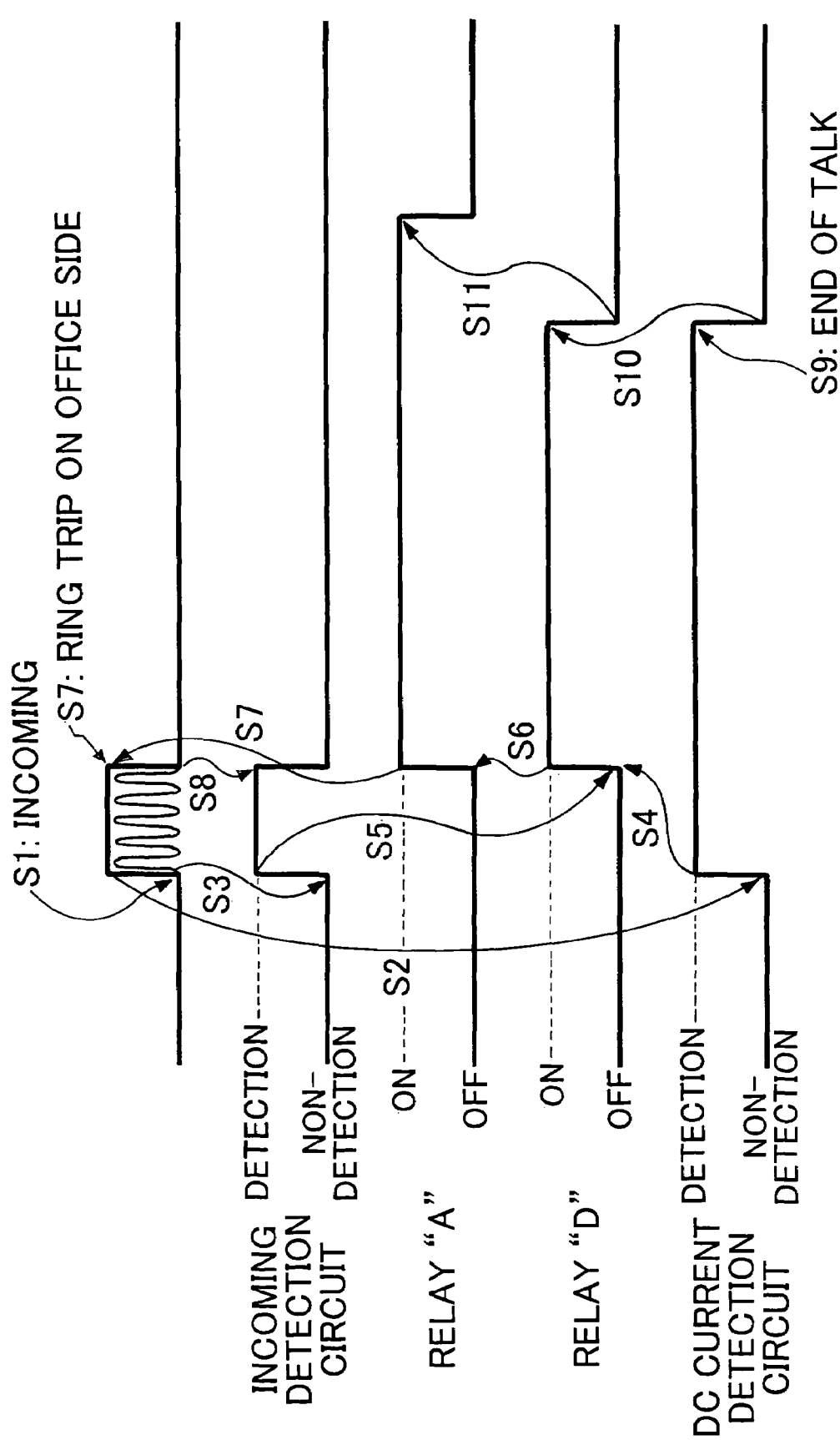

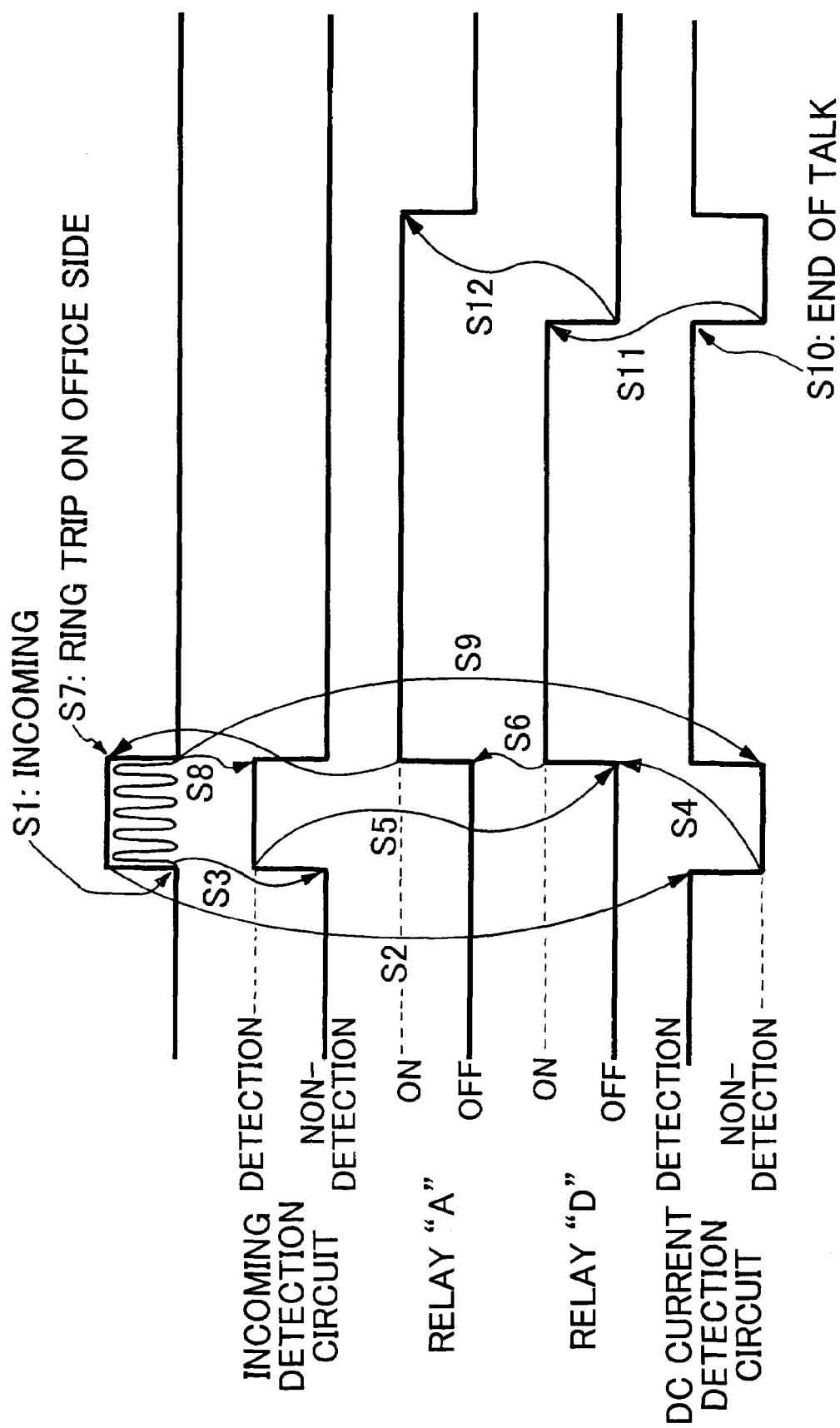

OFFICE-LINE TRUNK CIRCUIT OPERATING ON GROUND-START AND LOOP-START MODES, METHOD OF CONTROLLING SAME, AND CONTROL PROGRAM FOR SAME

BACKGROUND OF THE INVENTION

1. The Field of the Invention

The present invention relates to an office-line trunk circuit selectively operating on ground-start and loop-start modes, a method of controlling the circuit, and a control program for the circuit, and in particular, to (i) an office-line truck circuit serving both on the ground-start and loop-start modes, in which insulation between a primary office line and a secondary office line is secured by allowing a high-resistance detection circuit to detect the ground potential, which eliminates the need for using a de-linking circuit in a ground-start circuit in cases where a switching circuit and a loop-start mode are used, so that the detection is performed without a self power supply to be placed on the primary side of the office line, (ii) a method of controlling the office-line trunk circuit, and (iii) a control program for the office-line trunk circuit.

2. Related Art

In a conventional system in which both of a PBX and an office exchange are communicably connected to each other and the same hardware is used to selectively realize the function of loop start and ground start, it is necessary to have hardware including switch circuits.

There is another conventional system in which the switching is unnecessary but a self power supply is required. In this system, however, it is difficult to establish insulation between the primary side (i.e., an office exchange side) and the primary side (i.e., a PBX side) of an office line.

One conventional technique is disclosed by JP-A-S56 (1981)-122552. This publication provides a subscriber's terminal circuit which is connected with a local telephone exchange and which has loop-start and ground-start modes. This subscriber's terminal circuit is characterized by the following configurations and operations. In the loop-start mode, 1) a diode bridge circuit equipped with a resistor, capacitor and photo coupler detects a ringing signal outputted from the local telephone exchange through both a tip line and a ring line, and 2) when the local subscriber's terminal circuit is brought into its service mode, both of a talk current supply resistor and a transistor in a DC amplifier are made to establish a connection between the tip line and the ring line. This connection allows a comparative circuit to make a comparison between a voltage obtained by dividing the voltage between the chip and ring lines and a voltage obtained by feed-backing, though a feedback resistor, a voltage between the talk current supply resistor and the transistor of the DC amplifier. Information resultant from the comparison is used to control a base current of the transistor. In addition, a circuit consisting of a shunt resistor and a loop current detection photo coupler, which are connected in series with each other, is connected in parallel to the talk current supply resistor to detect a loop current. There is also provided a circuit to protect the electronic circuits including the comparative circuit and the transistor from surge voltage. On the other hand, 3) in the ground-start mode, a start signal from the local telephone exchange is detected by both a high-resistance resistor and a photo coupler for detecting slight-amount current, which are connected in series between the chip and ring lines. In addition, when the start is made from the subscriber's terminal circuit, a tip line ground signal sent back from the local telephone exchange is detected by the photo coupler.

For example, in the loop-start mode, a switch is turned off, during which time the ringing signal from the local telephone exchange is rectified by a diode bridge, before being detected by a first photo coupler.

In the service mode, an audio signal is bypassed by a capacitor so that DC voltage is applied to the non-inverting (+) terminal of an operational amplifier. The output thereof is dedicated to control of base currents of transistors and a shunt current from a loop current though the chip and ring lines is detected by a second photo coupler.

Moreover, in the ground-start mode, the switch is turned off to cause a third photo coupler to detect the start signal from the local telephone exchange. Accordingly, when the subscriber's terminal circuit activates the local telephone exchange, a start completion signal is detected by a fourth photo coupler.

In cases where, under the ground-start mode, the subscriber's terminal circuit activates the local telephone exchange and the fourth photo coupler detects the start completion signal, the subscriber's terminal circuit detects the ground from the local telephone exchange by using a −48V power supply in the circuit itself for the confirmation of the start completion signal.

As described, the switch is operated to select either the loop-start mode or the ground-start mode, so that the −48V power supply in the subscriber's terminal circuit itself is used to confirm the start completion signal.

Accordingly, the use of the −48V power supply in the subscriber's terminal circuit makes it difficult to establish insulation between the primary side (i.e., an office exchange side) and the primary circuit (i.e., a PBX side) of the office line.

Another conventional technique is proposed by JP-A-S62 (1987)-220095. This conventional publication discloses another type of office-line trunk circuit to detect the ground potential. The detection technique according to this publication eliminates the need for placing the de-linking circuit in the loop-start mode. This is because the ground detection is performed by making use of the potential of the self negative power supply only when the station is started under the ground-start mode.

When there is an incoming-call in this trunk circuit,-a US technique is performed such that a ring line remains as a negative potential with no changes in the potential and the tip line changes from its open state to the ground. Current, which is based on changes in the potential on the tip line, flows through a current monitoring circuit, and detected by a main detection element. A common control unit is notified of the incoming. When making the office start for the next outgoing, the ground potential is basically sent to the ring line. When the exchange-side circuitry in the office operates to send a signal indicating the ground to the tip line, changes in the potential to the ground are detected with current flowing from the current monitoring circuit to the negative power supply in the subscriber's terminal circuit.

Accordingly, in the case of this conventional detection technique, only when the office is activated on the ground-start mode, the potential of the self negative power supply is utilized for detecting the ground. Hence, if it is desired to apply this technique to establishment of the insulation between the primarily and secondary circuits of the office line, there is no alternative but to insulate the negative power supply itself from the secondary circuit.

In addition, another conventional technique is proposed by JP-A-H03(1991)-188793. Disclosed by this publication is a PBX capable of eliminating the need for setting a program when the exchange is installed. This elimination is realized through distinguishable registration of the type of a relevant contract office line, by performing ground-start type and loop-start type of dialing in response to detecting the power-on or reset of the PBX.

In this PBX, a power-on/reset detection unit detects an "on" state of the power or a reset state of the power, which then causes a controller to close a relay contact and to perform the ground-start type of dialing.

In this case, if the contract office line is the ground-start type of line, the controller uses a Tip ground detection circuit to identify the type and to register in a memory information showing that the identified office line is the ground-start type.

By contrast, when the contract office line is the loop-start type of line, the controller uses the Tip ground detection circuit to determine that the office line is not the ground-start type. The controller then moves to the loop-start type of dialing. In order to this dialing, the controller causes the relay contact to be open, both a Ring terminal and a Tip terminal to be coupled with a rectifying circuit. This controls a DC loop formation/loop current detection circuit identify that the contract office line is the loop-start type, and the identified information indicative of the loop-start type is registered in the memory. In order to detect the ground of the contract office line, the Tip ground detection circuit uses a −48V power supply placed in the PBX itself.

As described above, even in the conventional PBX, the −48V negative power supply in the exchange itself is used. Hence it is difficult to establish the insulation between the primary side (i.e., the contracted office side) and the secondary side (i.e., the exchange side) of the office line.

Another conventional technique is also proposed by JP-A-S59(1988)-168795.

This reference discloses a loop-start/ground-start line interface circuit, in which the operations are selected between the loop-start mode and the ground-start mode by performing a switch over responsively to a signal from either a loop-start circuit or a ground-start circuit.

In this conventional line interface circuit, a PBX is connected to an interface circuit via a telephone line circuit equipped with a tip conductor and a ring conductor. Via these conductors, line feed current is fed to a first differential amplifier and a second differential amplifier, respectively. A common-mode amplifier provides these differential amplifiers with mutually-equal reference signals, respectively. The common-mode circuit is switchable in such a manner that, under the loop-start mode, its connection is selective according to differences in the potential and, under the ground-start mode, the circuit is connected to a predetermined fixed bias voltage. In this PBX, detecting the ground (by a ground detector) is carried out using a negative power supply disposed in the PBX itself.

Accordingly, in the above conventional configuration, it is difficult to secure the insulation between the primary side (i.e., the contract office side) and the secondary side (i.e., the PBX side) of the office line, because the negative power supply, that is, −48V power supply, disposed in the PBX itself is used.

As described so far, if it is desired that the same office-line trunk circuit selectively performs both the loop-start operation and the ground-start operation, it is required for the circuit to have additional hardware means such as switch circuit. In contrast, when the circuit does not such a switch circuit, the circuit should use a self power supply disposed therein, resulting in that it is difficult to insulate the primary side (i.e., an office exchange side) from the secondary side (i.e., a PBX side) in an office line.

SUMMARY OF THE INVENTION

An object of the present invention is to provide, with due consideration to the difficulties of the above conventional techniques, an office-line trunk circuit selectively performing both of the loop-start and the ground-start modes, a method of controlling the same, and a program for controlling the same, in which the office-line trunk circuit has the same hardware capable of selectively performing both the loop-start operation and the ground-start operation, a switch circuit is unnecessary between both type of operations, and the insulation can be secured in an easy manner.

In order to realize the above object, as one aspect of the present invention, there is provided an office-line trunk circuit selectively performing both of the ground-start and the loop-start operations. In cases where both the ground-start operation and the loop-start operation are performed by an office-line trunk of the same private branch exchange, an office exchange is connected to the private branch exchange via an office bilateral trunk on a private branch exchange side and an office-line trunk on a private branch exchange side. The office-line trunk is provided with a DC current detection circuit having a first photo coupler detecting a loop current caused due to the ground of a tip line though the office bilateral trunk and supply of a negative power to a ring line; an incoming detection circuit having a second photo coupler detecting a ring signal supplied from the office bilateral trunk; and a DC sink circuit controlling the loop current by using a transistor inserted into a DC circuit of a diode bridge circuit connected to both the tip and ring lines, whereby both a loop activation and a loop hold of the office bilateral trunk is performed. The DC current detection circuit allows the first photo coupler to detect the loop current to be caused due to the ground of the tip line though the office bilateral trunk and supply of the negative power to the ring line, with the use of a resistor blocking the loop start in the office bilateral trunk, the resistor being adjusted in a resistance value to enable the DC current detection to be performed in the DC current detection circuit.

A first advantage according to the present invention is that both the loop-start and ground-start operations can be realized by the same hardware configuration and a switch circuit and a de-linking circuit for a ground-start circuit are unnecessary. The reason is that the DC current detection circuit of higher resistance value satisfies the regulations on both the loop-start and ground-start operations.

A second advantage according to the present invention is to secure the insulation between the primary side (i.e., an office exchange side) and the secondary side (i.e., a private branch exchange side) of an office line in an easy manner. The reason is that a power supply on the office exchange side can be used, with not self power supply applied to the line on the private branch exchange side.

BRIEF DESCRIPTION OF THE DRAWINGS

In the accompanying drawings:

FIG. 2 is a block diagram showing a PBX composing part of an office-line trunk circuit operating both on ground-start and loop-start modes, a method of controlling the same, and a control program for the same, which are provided according to the example of the present invention;

FIG. 3 is a timing chart showing the dialing operations of the circuit which starts on the ground-start mode in the embodiment;

FIG. 4 is a timing chart showing the dialing operations of the circuit which starts on the loop-start mode in the embodiment;

FIG. 5 is a timing chart showing the call-receiving operations of the circuit which operates on the ground-start mode in the embodiment; and FIG. 6 is a timing chart showing the call-receiving operations of the circuit which operates on the loop-start mode in the embodiment.

DETAILED DESCRIPTION OF THE PREFERRED EMBODIMENT

Figure 1:
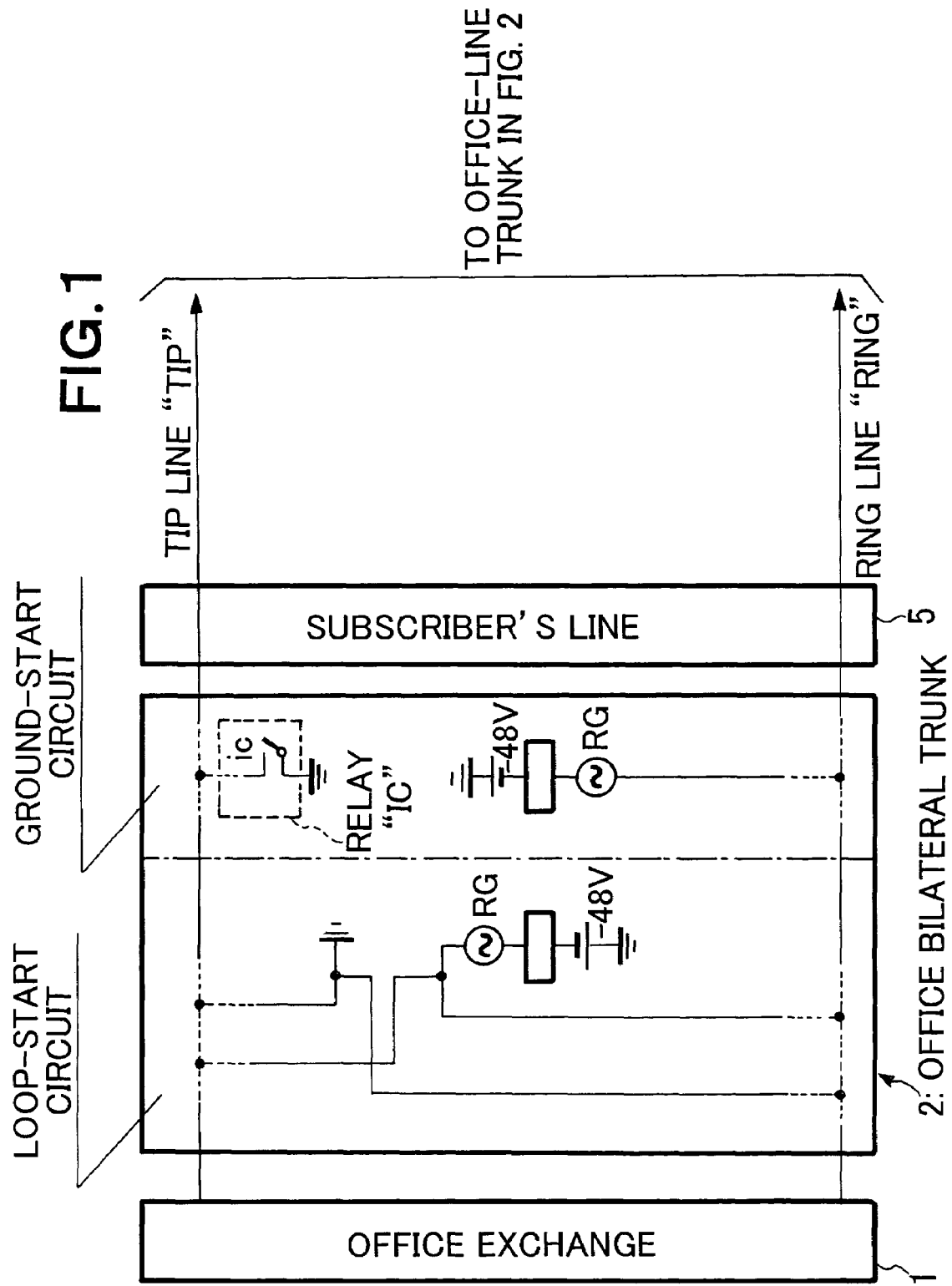
FIG. 1 is a block diagram showing an office exchange composing part of an office-line trunk circuit operating both on ground-start and loop-start modes, a method of controlling the same, and a control program for the same, which are provided according to an example of the present invention.

Referring to FIGS. 1 to 6, a first embodiment of the present invention will now be detailed.

FIGS. 1 and 2 are block diagrams each showing an embodiment of an office-line trunk circuit placed between an office exchange and a private branch exchange (PBX) to selectively perform both of the ground-start and the loop-start operations, a method of controlling the same, and a program for controlling the same, which are according to the present embodiment.

A system shown in FIGS. 1 and 2 is provided with an office exchange 1, a PBX 4, an office bilateral trunk 2 on the office exchange side, and an office-line trunk 3 on the PBX side. The office exchange 1 is connected to the PBX 4 via the office bilateral trunk 2, a subscriber's line 5, and office-line trunk 3.

The office exchange 1 is connected to the office bilateral trunk 2 via a tip and ring lines "Tip" and "Ring". The office bilateral trunk 2 is connected to the office-line trunk 3 via the tip and ring lines "Tip" and "Ring". The office-line trunk 3 is connected to the PBX 4 via lines "A" and "B". In the office-line trunk 3, there is provided a coupling talk transformer L inserted between (i) the tip and ring lines "Tip" and "Ring" on the side of the office exchange 1 and (ii) the lines "A" and "B" on the side of the PBX 4.

The office bilateral trunk 2 is equipped with a loop-start circuit used for a loop-start mode and a ground-start circuit used for a ground-start mode between the tip and ring lines "Tip" and "Ring". The loop-start circuit includes a signal generator of a ring signal RG with AC current (5V AC, 16 Hz) and a negative power supply of −48 V. The negative power supply is connected to the tip and ring lines "Tip" and "Ring", respectively, via the signal generator. In the loop-start circuit, both the tip and ring lines "Tip" and "Ring" are also connected to a ground, respectively. The ground-start circuit includes a signal generator of a ring signal RG with an AC current (5V AC, 16 Hz) a negative power supply of −48 V, and a relay IC with its make contact "ic". The negative power supply is connected to the ring line "Ring" via the signal generator. One terminal of the make contact "ic" is connected to a ground, and the other is connected to the tip line "Tip".

The office-line trunk 3 is equipped with a DC current detection circuit 31, an incoming detection circuit 32, and a DC sink circuit 33. These circuits 31 to 33 are inserted between the tip and ring lines "Tip" and "Ring" in parallel, respectively. There is provided: a relay G1 with a make contact "g1" between the ring line "Ring" and a ground via a resistor RST; a relay G2 (second switch) with a make contact "g2" between the tip line "Tip" and a resistor RP of the DC current detection circuit 31; a relay A (third switch) with a make contact "a" on the tip line "Tip" between the incoming detection circuit 32 and the DC sink circuit 33; and a relay D (fourth switch) with a make contact "d" between the tip line "Tip" and the DC sink circuit 33. These relays G1, G2, A, and D are controlled by a control circuit 41 disposed in the PBX 4. The control circuit 41 has a memory storing a predetermined control program and a CPU (Central Processing Unit) or processor executing the control program so as to control the relays G1, G2, A, and D.

Of these circuits 31 to 33, the DC current detection circuit 31 has a photo coupler PCDC to detect a loop current to be caused on account of supply of both the ground from the office bilateral trunk 2 on the office exchange side to the tip line "Tip" and the negative power (−48V) to the ring line "Ring". The incoming detection circuit 32 has a photo coupler PCRG to detect a ring signal RG (75V AC, 16 Hz) supplied from the office bilateral trunk 2 when receiving a call. The DC sink circuit 33 produces a proper loop current using a transistor Q to perform loop activation and loop hold of the office bilateral trunk 2.

To be more specific, the DC current detection circuit 31 makes the above loop current pass a high-resistance resistor RDC and makes the photo coupler PCDC detect the loop current via the resistor RDC. The resistance value of the resistor RDC is adjusted such that the value does not cause the office bilateral trunk 2 to be loop-started,but it is possible to detect DC current of the self office-line trunk 3. In this current detection circuit 31, flow of current through a photo diode PDD of the photo coupler PCDC allows a photo transistor PTD thereof to turn on and then a transistor DQ Darlington-connected to the photo transistor PTD to turn on, thus providing a DC DCT signal (i.e., signal for detecting DC current) to the control circuit 41 disposed in the PBX 4.

The resistor RDC has a high resistance value that prohibits the office bilateral trunk 2 from being loop-started as long as the office-line trunk circuit waits for the loop start. Inserting a higher resistance value of the resistor RDC reduces current passing in the DC current detection circuit 2. Consequently, the photo coupler PCDC is made up of a high-sensitivity one and has the Darlington-connected transistor DQ on a light reception side of the photo coupler, whereby improving the detection sensitivity.

The photo coupler PCDC is incorporated in the DC current detection circuit 31, so that insulation can be established between the primary side (i.e., the office exchange side) and the secondary side (i.e., the PBX side) on the office line.

In the DC current detection circuit 31, when dialing a call, the make contact "g2" of the relay "G2" is closed to additionally insert the further resistor RP in parallel to the high-resistance resistor RDC. This lowers the resistance value between the tip line "Tip" and the ring line "Ring", resulting in that the line loop current flowing through the DC current detection circuit 31 is increased. This increase improves sensitivity in detecting the ground.

The DC current detection circuit 31 responds to dialing a call on the ground-start mode by confirming the transmission of the ground to the tip line "Tip" responsively to completion of the start of the office bilateral trunk 2. The detection circuit 31 responds to a call-reception on the ground-start mode by confirming the transmission of the ground to the tip line "Tip". The detection circuit 31 responds to a call-reception on the loop-start mode by detecting the reception in a non-detection state in which the polarities are mutually reversed between the tip line "Tip" and the ring line "Ring". Moreover the detection circuit 31 also monitors the restoration of the line after the call reception in the ground-start and loop-start modes.

The DC sink circuit 33 operates to close a DC loop circuit toward the office bilateral trunk 2, thus starting the loop of the office bilateral trunk 2 on the loop-start mode. In addition, in the loop-start and ground-start modes, the DC sink circuit 33 operates to close the DC loop in order to respond to an incoming call and to hold the line during the service for the call.

As shown in FIG. 2, the DC sink circuit 33 is provided with a diode-bridge circuit of full-wave rectifier type consisting of diodes D331, D332, D333 and D334 and a DC current adjustment circuit connected to positive (+) and negative (−) terminals of the diode-bridge circuit. Both of the diode-bridge circuit and the DC current adjustment circuit are disposed between the tip and ring lines "Tip" and "Ring" to adjust DC loop current flowing therebetween.

The DC current adjustment circuit is provided with resistors RB and RE, a transistor Q, a Zener diode ZD, a capacitor CB, as shown in FIG. 2. Among these components, the positive (+) terminal of the diode-bridge circuit is connected to both of a base and a collector of the transistor Q via the resistor RB, an emitter of the transistor Q is connected to the negative (−) terminal of the diode-bridge circuit via the resistor RE, and the base of the transistor Q is connected to the negative terminal of the diode-bridge circuit via the Zener diode ZD. In this connection of the Zener diode ZD, an anode thereof is connected with the base of the transistor Q and a cathode thereof is connected with the negative terminal of the diode-bridge circuit. Hence a Zener voltage zd provided by the Zener diode ZD is able to adjust a current flowing through the resistor RE (serving as an emitter-biasing resistor of the transistor Q) to a value optimized for the line loop current.

The incoming detection circuit 32 is provided to detect the ring signal RG (75V AC, 16 Hz) coming from the office bilateral trunk 2 when a call is received. This detection is made using a photo coupler PCRG shown in FIG. 2.

To be specific, the incoming detection circuit 32 is provided with a capacitor CI and a resistor RI as well as the photo coupler PCRG. The capacitor CI, resistor RI and photo coupler PCRG, which are connected in series to each other, are disposed between the tip line "Tip" and the ring line "Ring" in the office-line trunk 3.

The ring signal RG is transmitted from the office bilateral trunk 2 through between the tip line "Tip" and the ring line "Ring". Once entering the incoming detection circuit 32 via the tip line "Tip", this ring signal RG flows, through the resistor RI, capacitor CI for cutting off a DC signal component, and a bilateral photo diode PDI1 or PDI2 in the photo coupler PCRG, to the ring line Ring. Hence, in the ground-start mode, the office bilateral trunk 2 is electrically terminated with its tip line "Tip" to the ground and its ring line "Ring" to a negative power from the negative power supply in the ground-start circuit. In contrast, in the loop-start mode, the office bilateral trunk 2 is electrically terminated with its tip line "Tip" to the negative power and its ring line "Ring" to the ground in the loop-start circuit.

Accordingly, the ring signal RG flows through the bilateral photo diode PDI1 or PDI2, so that an AC current is generated to flow therethrough. This AC current makes a photo transistor PTI "ON (sensed)", resulting in transmission of an RGDCT signal (i.e., signal for detecting a ring signal) to the control signal 41 of the PBX 4.

FIGS. 3 to 6 each show the various operations of the office-line trunk circuit according to the present embodiment, in which FIG. 3 is a timing chart showing the dialing operations of the circuit in the ground-start mode; FIG. 4 is a timing chart showing the dialing operations of the circuit in the loop-start mode; FIG. 5 is a timing chart showing the call-receiving operations of the circuit in the ground-start mode; and FIG. 6 is a timing chart showing the call-receiving operations of the circuit in the loop-start mode.

First, referring to FIG. 3, the operations for dialing a call in the ground-start mode, which are directed from the PBX 4 to the office exchange 1, will now be described.

When a call is dialed in the ground-start mode, the office-line trunk 3 begins with its dialing operations by causing the relays G1 and G2 to operate under the control of the control circuit 41 in the PBX 4 (step S1). This operation allows the make contact g1 of the relay G1 to supply the ground to the ring line "Ring" via the resistor RST for the dialing, so that an activation signal is sent to the office bilateral trunk 2 located on the side of the office exchange 1.

Responsively the office bilateral trunk 2 receives from the office-line trunk 3 the activation signal notifying that the ring line "Ring" is connected to the ground. The trunk 2 accepts the activation, and, in response to completion of the activation, causes the tip line "Tip" (which has been in its open state) to have the ground (step S2). In cases where the office bilateral trunk 2 waits for a call in its ground-start mode, the tip line "Tip" is open and the ring line "Ring" is connected to the negative power supply in the ground-start circuit.

The change of the tip line Tip from the open state to the ground, which responses to the completion of activation of the office bilateral trunk 2, enables the office-line trunk 3 to operate using the following path. It is therefore possible to confirm the completion of activation of the trunk 2.

That is, established is a path in which the ground of the office bilateral trunk 2, the tip line "Tip", the make contact "g2" of the relay "G2" in the office-line trunk 3, the parallel circuit of the resistors RP and RDC in the trunk 3, the photo diode PDD in the DC current detection circuit 31 in the trunk 3, the ring line "Ring", and the negative power supply in the office bilateral trunk 2 are electrically connected one to another.

This path enables a current to flow through the photo diode PDD in the DC current detection circuit 31, thus turning on the photo transistor PTD, thus turning on the transistor DQ in turn. Hence the DCDCT signal is allowed to be sent to the control circuit 41 of the PBX 4.

In order to avoid the office bilateral trunk 2 from being loop-started during a waiting period of time in the loop-start mode, a higher resistance value is given to the resistor RDC, as described before. Additionally, in order to secure the insulation between the primary and the secondary sides on the office line, the photo coupler PCDC is employed in the DC current detection circuit 31.

Because the connection of the higher-resistance-value resistor RDC lowers the amount of current flowing into DC current detection circuit 31, the photo coupler PCDC can be formed of a higher-sensitive photo coupler. The transistor DQ is Darlington-connected to the photo coupler PCDC as a signal receiver, thus raising detection sensitivity.

When dialing a call, the make contact "g2" of the relay "G2" is closed to insert the resistor RP in parallel to the resistor RDC, lowering the value of the resistance between the tip line "Tip" and the ring line "Ring". Such a decrease in the resistance permits the line loop current flowing through the DC current detection circuit 31 to increase, thus improving sensitivity in detecting the ground.

The control circuit 41 of the PBX 4 then confirms the activation of the office bilateral trunk 2, and, to hold the line, operates in sequence the relay "D" (step S3) and the relay "A" (step S4). Thus the following path is prepared for holding the line of the office bilateral trunk 2.

Practically, established is a path in which the ground in the office bilateral trunk 2, the tip line "Tip", the make contact "a" of the relay A in the office-line trunk 3, the make contact d of the relay D in the trunk 3, the DC sink circuit 33, the ring line "Ring", and the negative power supply in the office bilateral trunk 2 are electrically connected one to another. In this path, the diodes 332 and 334, transistor Q, and resistors RB and RE are inserted.

When the polarities are inversed because a party to be talked responds after the dialing, a further path is established, where the negative power supply in the office bilateral trunk 2, the tip line "Tip", the make contract "a" of the relay A in the office-line trunk 3, the make contact "d" of the relay D in the trunk 3, the DC sink circuit 33, the ring line "Ring", and the ground in the office bilateral trunk 2 are electrically connected one to another. Into this path, the diodes 333 and 331, transistor Q, and resistors RB and RE are inserted.

Using this path, the office-line trunk 3 holds the office bilateral trunk 2 and restores the relays G1 and G2 that was first operated to activate the trunk 2 (step S5).

During a talk, both of the tip line "Tip" and the ring line "Ring" are closed by the loop path consisting of the make contacts "a" and "d" and the DC sink circuit 33 having the diode bridge (D331, D332, D333 and D334) and the transistor Q, thus the talking line is held. The talk is allowed because its signals are able to pass through a coupling talk transformer L inserted between the tip and ring lines "Tip" and "Ring" on the office exchange side and lines "A" and "B" on the PBX side.

A capacitor, which is connected in series with the coupling talk trans former L between the tip and ring lines "Tip" and "Ring", prohibits DC current from passing the transformer L.

In addition, the capacitor CB, which is inserted between the base of the transistor Q and the resistor RE connected to the emitter of the transistor Q, is in charge of allowing an audio signal to bypass the transistor Q. When the audio signal originated from a talk is inputted to the base of the transistor Q for amplification therein, the amplified audio signal may cause fluctuations in a DC current held by the line. The bypassing capacitor CB prevents such fluctuations.

In the DC sink circuit 33, the line loop current is controlled to an optimum value by the circuitry consisting of the transistor Q, the Zener diode ZD, and the resistor RE. As shown in FIG. 2, a serial circuit of the Zener diode ZD and the resistor RE is connected in parallel to both the base and the emitter of the transistor Q. Controlling the line loop current to an optimum value allows the office bilateral trunk 2 to be loop-started, the line to be held, and the DC current detection circuit 31 to move its detection state even when both of the DC current detection circuits 31 and the DC sink circuit 33 in the office-line trunk 3 are connected in parallel to each other between the tip and ring lines "Tip" and "Ring".

By way of example, let an optimum value of the line loop current Iroop be 20 mA (, where an assumption is made such that a voltage Et-r between the tip and ring lines "Tip" and "Ring" in the office-line trunk 3 is 6V) and a Zener voltage of the Zener diode ZD be Ezd, the following calculations can be realized:

$$Et - r = 6\,V$$
$$= Ece + Iroop \times RE$$
$$\approx 0 + (Ezd - Ebe)$$
$$\approx Ezd - 0.7\,V$$
$$Ezd = 6\,V + 0.7\,V = 6.7\,V$$
$$RE = Et - r / Iroop$$

-continued
$$= 6V/20\,mA$$
$$= 300\,\text{\textit{''}}$$

Furthermore, in cases where the DC sink circuit 33 operates on the above conditions, the DC current detection circuit 31 should also have its detection ability. In order to meet such a condition, a current Iminpd that enables the photo coupler PCDC in the DC current detection circuit 31 to be its "on" state should be:

$$Iminpd \approx Et - r/RDC = 6\,V/RDC.$$

In addition, this amount Iminpd should be set to a value Imaxpd on which the office bilateral trunk 2 should not be loop-started in the loop-start mode.

The resistance value of the resistor RDC in the DC current detection circuit 31 is raised as high as possible to meet the forgoing various conditions. In the present embodiment, the resistor RDC of a higher resistance is adopted.

When the talk ends, the control circuit 41 of the PBX 4 returns the relay D (step S6) That is, the make contact "d" of the relay D is opened to release the office bilateral trunk 2 from holding the loop circuit. In consequence, the trunk 2 is released (step S7).

In the office bilateral trunk 2 in which the loop circuit that has been held is opened, the operations for the restoration are executed. Practically, the ground that has given to the tip line "Tip" is removed to be open state. Thus the trunk 2 returns to its original state in which the line is open in the office bilateral trunk 2.

When the tip line "Tip" becomes an open state, the DC current detection circuit 31 is released to return to a non-detection state thereof.

As described, the DC-cutting capacitor CI placed in the incoming detection circuit 32 has been charged between the tip and ring lines "Tip" and "Ring". Because there is only the DC loop consisting of the higher-resistance resistor RDC and the DC current detection circuit 31 between the tip and ring lines "Tip" and "Ring", the charge accumulated in the capacitor CI will not be discharged immediately, thus allowing the DC current detection circuit 31 to have the detection state thereof. Hence only the make contact d of the relay D is opened so that the discharging resistor RS become effective and is able to discharge the accumulated charge in the capacitor CI. After the DC current detection circuit 31 is shifted to a non-detection state thereof, the relay A is restored (step S8), so that opening the make contact "a" of the relay A allows the circuit 31 to be in a waiting state.

Referring to FIG. 4, the operations for dialing a call in the loop-start mode, which are directed from the PBX 4 to the office exchange 1, will now be described.

In the loop-start mode, the office bilateral trunk 2 waits for dialing with its tip line "Tip" connected to the ground and its ring line "Ring" connected to the negative power supply, which is a normal non-occupied state of the trunk 2.

When dialing a call, the office-line trunk 3 performs the dialing operations. Practically, under the control of the control circuit 41 in the PBX 4, the office-line trunk 3 operates the relay D (step S1), and then operates the relay A. This forms a serially connected circuit consisting of the make contacts "d" and "a" of the relays D and A. In the serially connected circuit, the DC sink circuit 33 composed of the diode bridge (diodes D331, D332, D333 and D334) and the transistor Q is inserted in series to close a path between the tip and ring lines "Tip"

and "Ring" using the relay D and the circuit 33. In response to this loop path that has been established, the office bilateral trunk 2 located next to the office exchange 1 is loop-started (activated) to allow a talk.

During the talk, the office-line trunk 3 uses the loop circuit (path) to hold the office bilateral trunk 2.

That is, during the talk, both of the tip line "Tip" and the ring line "Ring" are closed by the loop path consisting of the make contacts "a" and "d" and the DC sink circuit 33 having the diode bridge (D331, D332, D333 and D334) and the transistor Q, thus the talking line is held. The talk is allowed because its signals are able to pass through the coupling talk transformer L inserted between the tip and ring lines "Tip" and "Ring" on the office exchange side and lines "A" and "B" on the PBX side. The capacitor, which is connected in series with the coupling talk transformer L between the tip and ring lines "Tip" and "Ring", prohibits DC current from passing the transformer L.

When the talk is finished, the control circuit 41 of the PBX 4 restores the relay D (step S3). To be specific, the make contact "d" of the relay D is opened to release the office bilateral trunk 2 from being loop-held by the loop circuit.

In the office bilateral trunk 2, the operations for the restoration are carried out in response to the release of the holding loop circuit. Practically, the control circuit 41 of the PBX 4 restores the relay D, and then restores the relay A (step S4), with the result that the opened make contract "a" of the relay A returns the office-line trunk 3 to its waiting state.

Incidentally, in the case of this loop-start mode, the office bilateral trunk 2 provides a line state in which, in both of its waiting state and its talk states, the tip line "Tip" is connected to the ground and the ring line "Ring" is connected to the negative power supply. Accordingly, the DC current detection circuit 31 is in the detection state at any time.

Referring to FIG. 5, the operations for receiving a call in the ground-start mode, which are directed from the office exchange 1 to the PBX 4, will now be described.

In the ground-start mode, the office bilateral trunk 2 performs the call-receiving operations when it receives a call. The office bilateral trunk 2 waits for a call in the normal non-occupied state with its tip line "Tip" open and its ring line "Ring" connected to the negative power. Responsively to the call reception, the office bilateral trunk 2 changes to a potential condition in which the ring line "Ring" is connected to the negative power and the tip line "Tip" is connected to the ground, so that a ring signal RG (75V AC, 16 Hz) is received in a superposed manner (step S1).

In the office-line trunk 3, since the tip line "Tip" receives the ground through a path described below (step S2) the DC current detection circuit 31 realizes its detection state (step S4).

In other words, a make contact "ic" of the relay IC within the office bilateral trunk 2 is closed to be connected to the ground, which produces the path running through the tip line "Tip", the resistor RDC of the DC current detection circuit 31 within the office-line trunk 3, the photo diode PDD of the photo coupler PCDC in the circuit 31, the ring line "Ring", and the negative power supply connected to the ring line "Ring".

The above path causes current to pass through the photo diode PDD, thus making the photo transistor PTD "ON", thus making the transistor DQ "ON", which is Darlington-connected to the photo transistor PTD. Hence the photo transistor DQ is able to send the DCDCT signal to the control circuit 41 of the PBX 4.

The office-line trunk 3 then causes the incoming detection circuit 32 to detect, through a path described below (step S5), the ring signal RG appearing in a superposed manner between the tip and ring lines "Tip" and "Ring" (step S3).

In other words, the make contact "ic" of the relay IC within the office bilateral trunk 2 is closed to be connected to the ground, which produces the path running through the tip line "Tip", the incoming detection circuit 32 (i.e., the resistor RI, the DC cutting capacitor CI, and the bilateral photo diode PDI1 or PDI2 of the photo coupler PCRG in sequence), the ring line "Ring", and the negative power supply in the office bilateral trunk 2 via a generator of the ring signal RG.

The above path causes AC current to pass through the bilateral photo diode PDI1 or PDI2, the AC current originating from the ring signal RG. This makes the photo transistor PTI "ON", thus providing the RGDCT signal to the control circuit 41 of the PBX 4.

Thus, an incoming call form the office bilateral trunk 2 causes the photo transistor PTD to be "ON" and then the Darlington-connected transistor DQ to be "ON" in the DC current detection circuit 31, thereby providing the DCDCT signal to the control circuit 41 of the PBX 4 (step S4). In addition, the photo transistor PTI in the incoming detection circuit 32 is made "ON", thereby providing the RGDCT signal to the control circuit 41 of the PBX 4 (step S5). As a result, the PBX 4 responds to the incoming call from the office bilateral trunk 2 by activating the relay D (ON) (steps S4 and S5).

The "ON" state of the relay D (step S6) allows the relay A to be "ON" (step S7), thus producing a DC loop along a path described below, with a ring tip carried out in the office bilateral trunk 2.

In other words, the make contact "ic" of the relay IC within the office bilateral trunk 2 is closed to be connected to the ground, which produces the path running through the tip line "Tip", the make contact "a" of the relay A and the make contact "d" of the relay D in the office-line trunk 3, the DC sink circuit 33 in the office-line trunk 3, the ring line "Ring", and the negative power supply in the office bilateral trunk 2. In the DC sink circuit 33, the path runs through the diode D332, the circuit consisting of the resistor RB and the transistor Q, the resistor RE, and the diode D334.

As described, the office-line trunk 3 produces the DC loop to respond to the incoming call, which makes it possible that the ring trip is made in the office bilateral trunk 2, thus stop transmitting the ring signal RG (step S8).

The office-line trunk 3 recognizes that the transmission of the ring signal RG from the office bilateral trunk 2 has stopped, so that the incoming detection circuit 32 in the trunk 3 returns from the current detection state to the original non-detection state.

During the talk, both of the tip line "Tip" and the ring line "Ring" are closed by the loop path consisting of the make contacts "a" and "d" and the DC sink circuit 33 having the diode bridge (D331, D332, D333 and D334) and the transistor Q, thus the talking line is held. The talk is allowed because its signals are able to pass through the coupling talk transformer L inserted between the tip and ring lines "Tip" and "Ring" on the office exchange side and lines "A" and "B" on the PBX side.

When the talk is finished, the tip line "Tip" extending from the office bilateral trunk 2 changes its potential state from the ground to the open state (step S9), which allows the DC current detection circuit 31 of the office-line trunk 3 to be shifted from the detection state to the non-detection state. Moreover, since the control circuit 41 of the PBX 4 detects no DCDCT signal from the DC current detection circuit 31, the circuit 41 restores the relay D (step S10), whereby the open of the make contact "d" of the relay D releases the office bilateral trunk 2 from being held to the loop circuit.

Opening the holding loop circuit enables the office bilateral trunk 2 transits to performance of the restoring operations. That is, the ground given to the tip line "Tip" is removed to return to its open state, resulting in that the line of the office bilateral trunk 2 is brought into its original open state.

On making the relay D "OFF", the discharging resistor RS is inserted in the circuit so that the electric charge accumulated in the DC cutting capacitor CI in the incoming detection circuit 32 is discharged. After the DC current detection circuit 31 changes to its non-detection state, the relay A is restored (step S11), where its make contact "a" is opened to return to its waiting state.

Referring to FIG. 6, the operations for receiving a call in the loop-start mode, which are directed from the office exchange 1 to the PBX 4, will now be described.

In the loop-start mode, the office bilateral trunk 2 waits for dialing with its tip line "Tip" connected to the ground and its ring line "Ring" connected to the negative power supply, which is a normal non-occupied state of the trunk 2.

When receiving a call in the loop-start mode, the office bilateral trunk 2 carries out operations necessary for the call reception. Practically, the trunk 2 changes its potential from the normally-open waiting state in which the tip line "Tip" is connected to the ground and the ring line "Ring" is connected to the negative power supply, to the state in which the tip line "Tip" is connected to the negative power supply and the ring line "Ring" is connected to the ground. Accordingly, the ring signal RG (75V AC, 16 Hz) appears between the lines in a superposed manner (step S1).

In the office bilateral trunk 2 of which line is normally open to wait for a call, the tip line "Tip" is connected to the ground and the ring line "Ring" is connected to the negative power supply, while in the office-line trunk 2, the DC current detection circuit 31 waiting for a call in the normal state is in the detection state through the following path.

That is, the pass goes through the tip line "Tip" connected to the ground in the office lateral trunk 2, the tip line "Tip", the resistor RDC of the DC current detection circuit 31 in the office-line trunk 3, the photo diode PDD of the photo coupler PCDC in the circuit 31, the ring line "Ring", and the negative power supply connected to the ring line "Ring".

The above path allows current to flow through the photo diode PDD in the DC current detection circuit 31, whereby the photo transistor PTD in the circuit 31 is turned on. Furthermore, this causes the transistor DQ Darlington-connected to the photo transistor PTD to be turned on, providing DCDCT signal to the control circuit 41 of the PBX 4.

When receiving a call, the office bilateral trunk 2 performs the operations for the reception. Such operations necessitate a change in the potential between the tip and ring lines "Tip" and "Ring". In cases where the office bilateral trunk 2 waits for a call in the normal open, the tip and ring lines"Tip" and"Ring 2 are connected to the ground and the negative power supply, respectively. From this potential state, a change is made such that the tip and ring lines "Tip" and "Ring2 are connected to the negative power supply and the ground, respectively, in response to reception of a call. Hence, the ring signal RG (75V AC, 16 Hz) appears in a superposition manner (step S1).

The above change in the potential between the tip and ring lines "Tip" and "Ring" (step S2), which responds to reception of a call, causes the DC current detection circuit 31 in the office-line trunk 3 to change from its detection state to its non-detection state using the following path (step S3).

The above path goes through the negative power supply connected to the tip line "Tip" in the office bilateral trunk 2, the tip line "Tip", the resistor RDC in the DC current detection circuit 31, the photo diode PDD of the photo coupler PCDC in the circuit 31, the ring line "Ring", and the ground connecting to the ring line "Ring".

The above path prevents current from flowing through the photo diode PDD in the circuit 31, thus turning off the photo transistor PTD in the circuit 31. This also turns off the transistor DQ Darlington-connected to the photo transistor PTD, whereby the DCDCT signal is switched off responsively. The control circuit 41 of the PBX 4 is informed of this signal stop (step S4).

Further, the office-line trunk 3 allows the incoming detection circuit 32 to detect the ring signal RG (step S3) through the following path (step S3).

The path for detecting the ring signal goes through the negative power supply, a generator generating the ring signal RG, the tip line "Tip", the resistor RI in the incoming detection circuit 32, the DC cutting capacitor CI in the circuit 32, the bilateral photo diode PDI1 or PDI2 of the photo coupler PCRG in the circuit 32, the ring line "Ring", and the ground connecting to the ring line "Ring" in the office bilateral trunk 2.

This path makes it possible that AC current due resultant from the ring signal RG flows through the bilateral photo diode PDI1 or PDI2 of the photo coupler PCRG. Hence the photo transistor PTI is turned on in the incoming detection circuit 32, whereby the RGDCT signal is provided to the control circuit 41 of the PBX 4 (step S5).

Responsively to the call reception from the office bilateral trunk 2 causes the photo transistor PTD in the DC current detection circuit 31 to be turned off and its Darlington-connected transistor DC to be turned off, so that the control circuit 41 of the PBX 4 is informed of stopping the DCDCT signal thereto (step S4). In addition, the turn-on of the photo transistor PTI in the incoming detection circuit 32 allows the RGDCT signal to be sent to the control circuit 41 of the PBX 4 (step S5). As a result, the PBX 4 responds to the call reception from the office bilateral trunk 2 by activating the relay D (i.e., the make contact "d" is closed: ON) (steps S4 and S5).

Closing the relay D (i.e., "ON"; step S6) leads to activating the relay A (i.e., "ON"; step S7), whereby in order to make the office bilateral trunk 2 perform a ring trip, a DC loop circuit involving the trunk 2 is created through the following path.

In other words, the path goes through the negative power supply connected to the tip line "Tip" in the trunk 2, the tip line "Tip", the make contact "a" of the relay A in the office-line trunk 3, the make contract "d" of the relay D in the trunk 3, the DC sink circuit 33 (from diode D333 to diode D331 through resistor RB, base of the transistor Q, a parallel circuit composed of emitter and collector of the transistor Q, emitter of the transistor Q, and resistor RE), the ring line "Ring", and the ground in the trunk 2.

In the office lateral trunk 2, the ring trip is performed, because the office-line trunk 3 creates the DC loop circuit to respond to a received call, and the ring signal RG is stopped from being sent out (step S8).

The office-line trunk 3 recognizes the stop of transmission of the ring signal RU form the office lateral trunk 2, so that the incoming detection circuit 32 returns from the detection state to the non-detection state.

The ring trip in the office bilateral trunk 2 permits the trunk 2 itself to return to the normal open call-waiting state in which the tip line "Tip" is connected to the ground and the ring line "Ring" is connected to the negative power supply. Thus the DC current detection circuit 31 in the office-line trunk 3 returns from the non-detection circuit to the detection circuit using the following path.

The above path for the return goes through the ground connecting to the tip line "Tip" in the office bilateral trunk 2, the tip line "Tip", the resistor RDC in the DC current detection circuit 31 in the office-line trunk 3, the photo diode PDD of the photo coupler PCDC in the circuit 31, the ring line "Ring", and the negative power supply connecting to the ring line "Ring".

This path allows current to flow through the photo diode PDD in the circuit 31, thus allowing the photo transistor PTD in the circuit 31 to turn on again, thus allowing the Darlington-connected transistor DQ to turn on as well. Hence the DCDCT signal is given to the control circuit 41 of the PBX 4.

During the talk, both of the tip line Tip and the ring line "Ring" are closed by the loop path consisting of the make contacts "a" and "d" and the DC sink circuit 33 having the diode bridge (D331, D332, D333 and D334) and the transistor Q, thus the talking line is held. The talk is allowed because its signals are able to pass through the coupling talk transformer L inserted between the tip and ring lines "Tip" and "Ring" on the office exchange 1 side and lines "A" and "B" on the PBX 4 side.

When the talk is finished, this finish creates an instantaneous interruption in the ground potential on the tip line Tip and the negative power potential on the ring line Ring, both of which come from the office bilateral trunk 2, whereby both tip and ring lines "Tip" and "Ring" are brought into a temporal open state (step S10) Hence the DC current detection circuit 31 in the office-line trunk 3 is temporarily brought into the non-detection state from the detection state. The control circuit 41 of the PBX 4 detects the fact that the DCDCT signal from the circuit 31 has temporarily disappeared, and restores the relay D (step S11). The restored make contact "d" of the relay D releases the trunk from being held.

In the trunk 2, the end of the talk also creates an instantaneous interruption in the ground potential on the tip line "Tip" and the negative power potential on the ring line "Ring 2, both of which come from the office bilateral trunk 2, whereby both tip and ring lines "Tip" and "Ring" are also brought into a temporal open state. After this, the line state is restored to both of the ground potential on the tip line "Tip" and the negative power potential on the ring line "Ring", providing the original office bilateral trunk 2 which is open.

The DC current detection circuit 31 in the office-line trunk 3 is again shifted to the detection state, waiting for the next call.

On completion of turning off the relay D, the discharging resistor RS becomes active to discharge the electric charge accumulated in the DC cutting capacitor CI in the incoming detection circuit 32. When the DC current detection circuit 31 transits to the non-detection state, the relay A is restored (step S12). That is, opening the make contact "a" of the relay A allows the office-line trunk 3 to return to its waiting state.

Accordingly, in the office-line trunk 3 formed according to the present embodiment, the ground is detected using the detection circuit 31 of higher resistance. This usage eliminates the need for employment of a switching circuit and a circuit de-linking the ground-start circuit in the loop-start mode. In addition, there is no self power supply for detection on the primary side of the office line, so that insulation can be secured easily and steadily between the primary (office exchange) and secondary (PBX) sides of the office line.

For the sake of completeness, it should be mentioned that the various embodiments explained so far are not definitive lists of possible embodiments. The expert will appreciates that it is possible to combine the various construction details or to supplement or modify them by measures known from the prior art without departing from the basic inventive principle.

What is claimed is:

1. An office-line trunk circuit selectively operating on ground-start and loop-start modes, the trunk circuit comprising:
    an office bilateral trunk for an office exchange;
    a tip line and a ring line; and
    an office-line trunk for a PBX (private branch exchange), the office-line trunk being connected to the office bilateral trunk via the tip and ring lines and being used for both a ground start and a loop start selectively performed by the office bilateral trunk,
    wherein said office-line trunk comprises:
    a DC current detection circuit comprising a first photo coupler detecting a DC loop current when a ground is supplied to the tip line and a negative power to the ring line from the office bilateral trunk, and a resistor whose resistance is adjusted so as to prevent the loop start in the office bilateral trunk and allow DC current to be detected in the DC current detection circuit, the first photo coupler detecting the loop current using the resistor;
    an incoming detection circuit comprising a second photo coupler detecting a ring signal coming from the office bilateral trunk; and
    a DC sink circuit having comprising a diode bridge circuit connected between the tip and ring lines and configured to have a DC circuit provided with a transistor controlling the DC loop current so that the office bilateral trunk is allowed to be loop-activated and loop-held.

2. The office-line trunk circuit according to claim 1, wherein said DC sink circuit comprising:
    a DC current adjustment circuit connected between a positive terminal and a negative terminal of the diode bridge circuit that adjusts the DC loop current,
    wherein said DC current adjustment circuit is configured such that:
    a positive output of the diode bridge circuit is connected to both of a base of the transistor via a first resistor and a collector of the transistor;
    an emitter of the transistor is connected to an negative output of the diode bridge circuit via a second resistor; and
    a Zener diode is connected between the base of the transistor and the negative output of the diode bridge circuit so that an anode and a cathode of the Zener diode are connected to the base of the transistor and the negative output of the diode bridge circuit, whereby a Zener voltage of the Zener diode is applied to control current flowing through the second resistor, the controlled current is the line loop current.

3. The office-line trunk circuit according to claim 2, wherein said DC current detection circuit comprises means for detecting an incoming call by recognizing, in a ground-start mode, a DC current detecting state of the DC current detection circuit which is realized by supplying the ground and the negative power to the tip and ring lines, and, in a loop-start mode, a transition of the DC current detection circuit from a DC current detecting state thereof to a DC current non-detecting state thereof, the transition is in response to the reversal of polarities, the supply of both of the ground and the negative powers so that the negative power is supplied to the tip line and the ground is supplied to the ring line, wherein said DC current adjustment circuit has a DC loop circuit for producing the line loop current and performing a ring trip.

4. The office-line trunk circuit according to claim 2, wherein said DC current detection circuit comprises means for detecting an incoming call by calculating, in a ground-start mode, a logical multiplication between a DC current detecting state of the DC current detection circuit which is realized by supplying the ground and the negative power to the tip and ring line and a detected state of the incoming detection circuit causing the second photo coupler to detect the ring signal coming from the office bilateral trunk, and, in a loop-start mode, a logical multiplication between a transition of the DC current detection circuit from a DC current detecting state thereof to a DC current non-detecting state thereof, the transition responding to reversing in polarities the supply of both of the ground and the negative power so that the negative power is supplied to the tip line and the ground is supplied to the ring line and a detected state of the incoming detection circuit causing the second photo coupler to detect the ring signal coming from the office bilateral trunk, wherein the DC current adjustment circuit comprises a DC loop circuit for producing the line loop current and performing a ring trip.

5. The office-line trunk circuit according to claim 1, further comprising:
a first switch between the ring line and a ground;
a second switch between the tip line and the incoming detection circuit;
a third switch on the tip line between the incoming detection circuit and the DC sink circuit;
a fourth switch between the tip line and the DC sink circuit; and
a control circuit connected to the first to fourth switches and the first and second photo couplers, for controlling the first to fourth switch based on the DC loop current detected by the first photo couplers and the ring signal detected by the second photo couplers.

6. A method of controlling an office-line trunk circuit selectively operating on ground-start and loop-start modes, the trunk circuit comprising:
an office bilateral trunk for an office exchange;
a tip line and a ring line; and
an office-line trunk for a PBX (private branch exchange), the office-line trunk being connected to the office bilateral trunk via the tip and ring lines and being used for both a ground start and a loop start selectively performed by the office bilateral trunk,
wherein said office-line trunk comprises:
a DC current detection circuit comprises a first photo coupler detecting a DC loop current when a ground is supplied to the tip line and a negative power to the ring line from the office bilateral trunk, and a resistor whose resistance is adjusted so as to prevent the loop start in the office bilateral trunk and allow DC current to be detected in the DC current detection circuit, the first photo coupler detecting the loop current using the resistor;
an incoming detection circuit comprising a second photo coupler detecting a ring signal coming from the office bilateral trunk;
a DC sink circuit comprising a diode bridge circuit connected between the tip and ring lines and configured to have a DC circuit provided with a transistor controlling the DC loop current so that the office bilateral trunk is allowed to be loop-activated and loop-held;

a first switch, between the ring line and a ground, connected to the ground via a resistor;
a second switch between the tip line and the second resistor;
a third switch on the tip line between the incoming detection circuit and the DC sink circuit;
a fourth switch between the tip line and the DC sink circuit; and
a control circuit connected to the first to fourth switches and the first and second photo couplers, for controlling the first to fourth switch based on the DC loop current detected by the first photo couplers and the ring signal detected by the second photo couplers,
wherein said DC sink circuit comprises, as the DC circuit, a DC current adjustment circuit connected between a positive terminal and a negative terminal of the diode bridge circuit so as to adjust the DC loop current,
wherein said DC current adjustment circuit is configured such that:
a positive output of the diode bridge circuit is connected to both of a base of the transistor via a resistor RB and a collector of the transistor;
an emitter of the transistor is connected to an negative output of the diode bridge circuit via a resistor RE; and
a Zener diode is connected between the base of the transistor and the negative output of the diode bridge circuit so that an anode and a cathode of the Zener diode are connected to the base of the transistor and the negative output of the diode bridge circuit, respectively, whereby a Zener voltage of the Zener diode is applied to control current flowing through the second resistor, the controlled current being the line loop current,
said method comprising:
when dialing a call from a PBX side to an office exchange side in the ground-start mode, enabling the following operations to be performed:
said control circuit operates the first and second switches for a dialing operation;
said first switch causes the ground to be supplied to the ring line via a resistor;
the dialing operation is performed to send a ring signal to the office bilateral trunk;
said office bilateral trunk receives the ring signal with the ring line grounded from the office bilateral trunk and performs a receiving operation for an activation;
said office bilateral trunk responds to a completion of the activation in which the tip line changes from an open state thereof to the ground thereof;
said office trunk allows the DC current detection circuit to confirm the completion of the activation in the office bilateral trunk and to provide an activation completion signal to the control circuit;
said PBX confirms the activation of the office bilateral trunk;
said control circuit operates the fourth switch for holding the line and operates the third switch to allow the DC sink circuit to hold the line in the office bilateral trunk;
said office-line trunk holds the office bilateral trunk, restores the first and second switch that has been subjected to the operation for activating the office bilateral trunk, and allows the DC sink circuit to hold the line during a talk;
said control circuit responds to an end of the talk by restoring the fourth switch whereby the fourth switch releases the office bilateral trunk from being held, the office bilateral trunk responds to an open of the holding loop circuit by performing a restoration operation whereby the tip line is separated from the ground so as to be open, so that the line in the office bilateral trunk returns to an original open state and the DC current detection circuit is released to return to a non-detection state thereof;

only said fourth switch is opened whereby an electric charge accumulated in a DC component cutting capacitor contained in the incoming detection circuit between the tip and ring lines is discharged via a discharging resistor; and after the discharge to realize the non-detection state of the DC current detection circuit, said third switch is restored so that the third switch is opened to return to a waiting state.

7. The method according to claim 6, further comprising:
when dialing a call from a PBX side to an office exchange side in the loop-start mode, enabling the following operations to be performed:
said office-line trunk operates the third and fourth switches in turn under the control of the control circuit of the PBX for performing a dialing operation, whereby, to a serial circuit composed of the third and fourth switches between the tip and ring lines, the DC sink circuit is serially connected to realize a loop circuit between the tip and ring lines;
a loop activation for the office bilateral trunk is made to allow a talk;
during the talk, said office-line trunk uses the loop circuit to hold the office bilateral trunk; and
after the talk, said control circuit restores the fourth switch whereby the fourth switch releases the office bilateral trunk from being held and then restores the third switch to return to the waiting state.

8. The method according to claim 6, further comprising:
when a call is sent from an office exchange side to a PBX side in the ground-start mode, enabling the following operations to be performed:
said office bilateral trunk, for performing a call-reception operation, provides a negative power to the ring line and the ground to the tip line, the tip line being normally open state for waiting for a call and the ring line being powered negatively by the negative power, whereby causing a ring signal to be superposed, the tip connected to the ground in the office-line trunk causes the DC current detection circuit to become a detection state thereof and a notification of the detection state is sent to the control circuit;
said office-line trunk allows the incoming detection circuit to the ring signal appearing between the tip and ring signals;
a detection signal is sent to the control circuit, thereby responding to a call reception from the office bilateral trunk by activating the third and fourth switches in turn so as to establish a DC loop to the office bilateral trunk;
said office bilateral trunk is caused to perform a ring trip, whereby in the office bilateral trunk, the DC loop is closed to respond to the call reception so that the ring trip is performed to stop sending the ring signal;
said office-line trunk respond to the stop of the ring signal from the office bilateral trunk by allowing the incoming detection circuit to change the detection state to the non-detection state;
when the talk is ended, the tip line from the office bilateral trunk responds to the end of the talk by changing a state thereof from the ground to the open state, whereby the DC current detection circuit is allowed to change from the detection state to the non-detection state;
said control circuit responds to no signal from the DC current detection circuit by restoring the fourth switch;
after turning off the fourth switch, an electric change accumulated in a DC component cutting capacitor in the incoming detection circuit is discharged via a discharging resistor; and
after the non-detection state of the DC current detection circuit, said third switch is restored so that the third switch is opened to return to a waiting state.

9. The method according to claim 6, further comprising:
when a call is sent from an office exchange side to a PBX side in the loop-start mode, enabling the following operations to be performed:
said office bilateral trunk, for performing a call-reception operation, provides a negative power to the tip line and the ground to the ring line, the tip line being normally open and connected to the ground for waiting for a call and the ring line being powered negatively by the negative power, whereby causing a ring signal to be superposed, whereby the DC current detection circuit in the office-line trunk is in a normal waiting state corresponding to a detection state, in which when a call is received, the office bilateral trunk, for performing a call-reception operation, provides a negative power to the tip line and the ground to the ring line, whereby causing a ring signal to be superposed;
the call reception provides changes of the tip line to the negative power and the ring line to the ground;
the changes causes the DC current detection circuit in the office-line trunk to transit from the detection state to the non-detection state, a notification of the non-detection state is sent to the control circuit;
said office-line trunk allows the incoming detection circuit to detect the ring signal appearing between the tip and ring lines and to send a detected signal to the control circuit;
the PBX responds to the call reception from the office bilateral trunk by activating the fourth switch, of which activation "on" causes the third switch to be "on" so that a DC loop is produced to office bilateral trunk;
a ring trip is allowed to be performed in the office bilateral trunk such that, when the office-line trunk responds to the call reception by producing the DC loop, the ring trip is performed, whereby the ring signal is stopped from being sent out;
the incoming detection circuit responds to the stop of sending of the ring signal from the office bilateral trunk by retuning the detection state to the non-detections state;
the ring trip in the office bilateral trunk allows the office bilateral trunk to return to a state in which the tip line is normally open and connected to the ground for waiting for a call and the ring line is powered negatively by the negative power, whereby the DC current detection circuit returns from the non-detection state to the detection state;
a detection state signal is sent to the control circuit;
responsively to an end of a talk, the ground supplied from the office bilateral trunk to the tip line and the negative power supplied the office bilateral trunk to the ring line are temporarily shut down so that both tip and ring lines are temporarily open, causing the DC current detection circuit to temporarily transit from the detection state to the non-detection state;

responsively to the temporary stop of the detection state signal form the DC current detection circuit, the control circuit restores the fourth switch, the operation of the fourth switch causing the office bilateral trunk to be released from being held, whereby the ground and the negative power supplied respectively to the tip and ring lines in the office bilateral trunk are temporarily shut down in response to the end of the talk so that the tip and ring lines become temporarily open;

the ground and the negative power are again supplied to the tip and ring lines whereby the line in the office bilateral trunk returns to the original open state and the DC current detection circuit in the office-line trunk returns to the detection state again for waiting for a call to be dialed next;

after turning off the fourth switch, an electric change accumulated in a DC component cutting capacitor in the incoming detection circuit is discharged via a discharging resistor; and after the non-detection state of the DC current detection circuit, said third switch is restored so that the make contact of the third switch is opened to return the office-line trunk to the waiting state.

10. A control circuit comprising a memory that stores a controll program which executes a method of controlling an office-line trunk circuit selectively operating on ground-start and loop-start modes, the trunk circuit comprising:

an office bilateral trunk for an office exchange;

a tip line and a ring line; and an office-line trunk for a PBX (private branch exchange), the office-line trunk being connected to the office bilateral trunk via the tip and ring lines and being used for both of a ground start and a loop start selectively performed by the office bilateral trunk, wherein said office-line trunk comprises:

a DC current detection circuit comprising a first photo coupler detecting a DC loop current when a ground is supplied to the tip line and a negative power to the ring line from the office bilateral trunk, and a resistor whose resistance is adjusted so as to prevent the loop start in the office bilateral trunk and allow DC current to be detected in the DC current detection circuit, the first photo coupler detecting the loop current using the resistor;

an incoming detection circuit comprising a second photo coupler detecting a ring signal coming from the office bilateral trunk;

a DC sink circuit having a diode bridge circuit connected between the tip and ring lines and configured to have a DC circuit provided with a transistor controlling the DC loop current so that the office bilateral trunk is allowed to be loop-activated and loop-held;

a first switch, between the Ring line and a ground, connected to the ground via a resistor;

a second switch between the tip line and the second resistor;

a third switch on the tip line between the incoming detection circuit and the DC sink circuit;

a fourth switch between the tip line and the DC sink circuit; and a control circuit connected to the first to fourth switches and the first and second photo couplers, for controlling the first to fourth switch based on the DC loop current detected by the first photo couplers and the ring signal detected by the second photo couplers, wherein said DC sink circuit comprises, as the DC circuit, a DC current adjustment circuit connected between a positive terminal and a negative terminal of the diode bridge circuit so as to adjust the DC loop current, wherein said DC current adjustment circuit is configured such that:

a positive output of the diode bridge circuit is connected to both of a base of the transistor via a resistor RB and a collector of the transistor;

an emitter of the transistor is connected to an negative output of the diode bridge circuit via a resistor RE; and a Zener diode is connected between the base of the transistor and the negative output of the diode bridge circuit so that an anode and a cathode of the Zener diode are connected to the base of the transistor and the negative output of the diode bridge circuit, respectively, whereby a Zener voltage of the Zener diode is applied to control current flowing through the resistor RE, the controlled current is the line loop current;

said method comprising:

when dialing a call from a PBX side to an office exchange side in the ground-start mode, enabling the following operations to be performed:

said control circuit operates the first and second switches for a dialing operation;

said first switch causes the ground to be supplied to the ring line via a resistor;

the dialing operation is performed to send a ring signal to the office bilateral trunk;

said office bilateral trunk receives the ring signal with the ring line grounded from the office bilateral trunk and performs a receiving operation for an activation;

said office bilateral trunk responds to a completion of the activation in which the tip line changes from an open state thereof to the ground thereof;

said office trunk allows the DC current detection circuit to confirm the completion of the activation in the office bilateral trunk and to provide an activation completion signal to the control circuit;

said PBX confirms the activation of the office bilateral trunk;

said control circuit operates the fourth switch for holding the line and operates the third switch to allow the DC sink circuit to hold the line in the office bilateral trunk;

said office-line trunk holds the office bilateral trunk, restores the first and second switch that has been subjected to the operation for activating the office bilateral trunk, and allows the DC sink circuit to hold the line during a talk;

said control circuit responds to an end of the talk by restoring the fourth switch whereby the fourth switch releases the office bilateral trunk from being held, the office bilateral trunk responds to an open of the holding loop circuit by performing a restoration operation whereby the tip line is separated from the ground so as to be open, so that the line in the office bilateral trunk returns to an original open state and the DC current detection circuit is released to return to a non-detection state thereof;

only said fourth switch is opened whereby an electric charge accumulated in a DC component cutting capacitor contained in the incoming detection circuit between the tip and ring lines is discharged via a discharging resistor; and, after the discharge to realize the non-detection state of the DC current detection circuit, said third switch is restored so that the third switch is opened to return to a waiting state.

11. The control circuit comprising a memory that stores a control program which executing the method according to claim 10, wherein said method further comprises:

when dialing a call from a PBX side to an office exchange side in the loop-start mode, enabling the following operations to be performed:

said office-line trunk operates the third and fourth switches under the control of the control circuit of the PBX for performing a dialing operation, whereby, to a serial circuit composed of the third and fourth switches between the tip and ring lines, the DC sink circuit is serially connected to realize a loop circuit between the tip and ring lines;

a loop activation for the office bilateral trunk is made to allow a talk;

during the talk, said office-line trunk uses the loop circuit to hold the office bilateral trunk; and after the talk, said control circuit restores the fourth switch whereby the fourth switch releases the office bilateral trunk from being held and then restores the third switch to return to the waiting state.

12. The control circuit comprising a memory that stores a control program which executing the method according to claim 10, wherein said method further comprises:

when a call is sent from an office exchange side to a PBX side in the ground-start mode, enabling the following operations to be performed:

said office bilateral trunk, for performing a call-reception operation, provides a negative power to the ring line and the ground to the tip line, the tip line being normally open state for waiting for a call and the ring line being powered negatively by the negative power, whereby causing a ring signal to be superposed, the tip connected to the ground in the office-line trunk causes the DC current detection circuit to enter a detection state thereof and a notification of the detection state is sent to the control circuit;

said office-line trunk allows the incoming detection circuit to the ring signal appearing between the tip and ring signals;

a detection signal is sent to the control circuit, thereby responding to a call reception from the office bilateral trunk by activating the third and fourth switches to establish a DC loop to the office bilateral trunk;

said office bilateral trunk is caused to perform a ring trip, whereby in the office bilateral trunk, the DC loop is closed to respond to the call reception so that the ring trip is performed to stop sending the ring signal;

said office-line trunk responds to the stop of the ring signal from the office bilateral trunk by allowing the incoming detection circuit to change the detection state to the non-detection state;

when the talk is ended, the tip line from the office bilateral trunk responds to the end of the talk by changing a state thereof from the ground to the open state, whereby the DC current detection circuit is allowed to change from the detection state to the non-detection state;

said control circuit responds to no signal from the DC current detection circuit by restoring the fourth switch;

after turning off the fourth switch, an electric change accumulated in a DC component cutting capacitor in the incoming detection circuit is discharged via a discharging resistor; and after the non-detection state of the DC current detection circuit, said third switch is restored so that the third switch is opened to return to a waiting state.

13. The control circuit comprising a memory that stores a control program which executing the method according to claim 10, wherein said method further comprises:

when a call is sent from an office exchange side to a PBX side in the loop-start mode, enabling the following operations to be performed:

said office bilateral trunk, for performing a call-reception operation, provides a negative power to the tip line and the ground to the ring line, the tip line being normally open and connected to the ground for waiting for a call and the ring line being powered negatively by the negative power, whereby causing a ring signal to be superposed, whereby the DC current detection circuit in the office-line trunk is in a normal waiting state corresponding to a detection state, in which when a call is received, the office bilateral trunk, for performing a call-reception operation, provides a negative power to the tip line and the ground to the ring line, whereby causing a ring signal to be superposed;

the call reception provides changes of the tip line to the negative power and the ring line to the ground;

the changes causes the DC current detection circuit in the office-line trunk to transit from the detection state to the non-detection state, a notification of the non-detection state is sent to the control circuit;

said office-line trunk allows the incoming detection circuit to detect the ring signal appearing between the tip and ring lines and to send a detected signal to the control circuit;

the PBX responds to the call reception from the office bilateral trunk by activating the fourth switch, of which activation "on" causes the third switch to be "on" so that a DC loop is produced to office bilateral trunk;

a ring trip is allowed to be performed in the office bilateral trunk such that, when the office-line trunk responds to the call reception by producing the DC loop, the ring trip is performed, whereby the ring signal is stopped from being sent out;

the incoming detection circuit responds to the stop of sending of the ring signal from the office bilateral trunk by retuning the detection state to the non-detections state;

the ring trip in the office bilateral trunk allows the office bilateral trunk to return to a state in which the tip line is normally open and connected to the ground for waiting for a call and the ring line is powered negatively by the negative power, whereby the DC current detection circuit returns from the non-detection state to the detection state;

a detection state signal is sent to the control circuit;

responsive to an end of a talk, the ground supplied from the office bilateral trunk to the tip line and the negative power supplied the office bilateral trunk to the ring line are temporarily shut down so that both tip and ring lines are temporarily open, causing the DC current detection circuit to temporarily transit from the detection state to the non-detection state;

responsive to the temporary stop of the detection state signal form the DC current detection circuit, the control circuit restores the fourth switch, the operation of the fourth switch causing the office bilateral trunk to be released from being held, whereby the ground and the negative power supplied respectively to the tip and ring lines in the office bilateral trunk are temporarily shut down in response to the end of the talk so that the tip and ring lines become temporarily open;

the ground and the negative power are again supplied to the tip and ring lines whereby the line in the office bilateral trunk returns to the original open state and the DC current detection circuit in the office-line trunk returns to the detection state again for waiting for a call to be dialed next;

after turning off the fourth switch, an electric change accumulated in a DC component cutting capacitor in the incoming detection circuit is discharged via a discharging resistor; and after the non-detection state of the DC current detection circuit, said third switch is restored so that the make contact of the third switch is opened to return the office-line trunk to the waiting state.

* * * * *

UNITED STATES PATENT AND TRADEMARK OFFICE
CERTIFICATE OF CORRECTION

PATENT NO. : 7,539,299 B2
APPLICATION NO. : 10/926363
DATED : May 26, 2009
INVENTOR(S) : Kazuo Kanayama It is certified that error appears in the above-identified patent and that said Letters Patent is hereby corrected as shown below:

Column 14, Line 61 delete "RU" and insert --RG--

Signed and Sealed this

Twentieth Day of October, 2009

David J. Kappos
*Director of the United States Patent and Trademark Office*